I. G. HUMPHREY.
DETACHABLE LUG FOR TRACTOR WHEELS.
APPLICATION FILED OCT. 31, 1919.
1,368,260.  Patented Feb. 15, 1921.
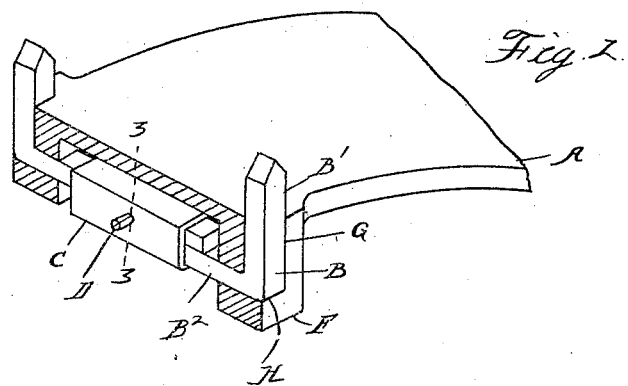
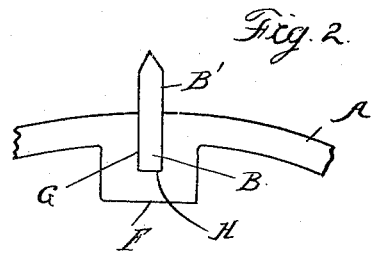
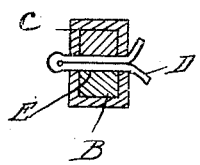
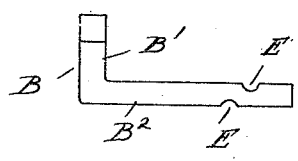
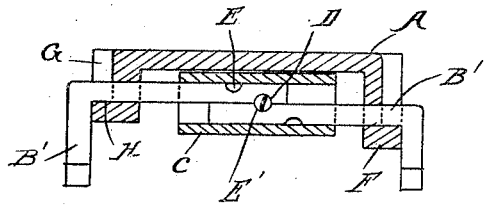
Inventor
Ira G. Humphrey
By Whittemore Hulbert & Whittemore
Attorneys

UNITED STATES PATENT OFFICE.

IRA G. HUMPHREY, OF MONROE, MICHIGAN.

DETACHABLE LUG FOR TRACTOR-WHEELS.

1,368,260.  Specification of Letters Patent.  Patented Feb. 15, 1921.

Application filed October 31, 1919. Serial No. 334,724.

*To all whom it may concern:*

Be it known that I, IRA G. HUMPHREY, a citizen of the United States of America, residing at Monroe, in the county of Monroe and State of Michigan, have invented certain new and useful Improvements in Detachable Lugs for Tractor-Wheels, of which the following is a specification, reference being had therein to the accompanying drawings.

The invention relates to tractor wheels or other wheels running upon the ground, which are provided with lugs or projections for digging into the soil to increase the traction. It is usual to provide tractor wheels with such lugs, but when traveling over highways, they are very objectionable on account of the injury to the surface of the road and in some States their use upon such highways is prohibited. It is the object of the present invention to provide a lug which can be quickly attached to the tractor wheel and as easily removed or withdrawn within the smooth periphery of the wheel when not needed. To this end the invention consists in the construction as hereinafter set forth.

In the drawings:

Figure 1 is a sectional perspective view showing a portion of the rim or periphery of the tractor wheel and my improved lug in engagement therewith;

Fig. 2 is a side elevation;

Fig. 3 is a cross-section on line 3—3 of Fig. 1;

Fig. 4 is an elevation of the coöperating lugs detached;

Fig. 5 is a cross-section showing the lugs reversed in position to be withdrawn within the periphery of the wheel.

A is the rim of a tractor wheel of any suitable construction, said rim having a smooth periphery for traveling over roads and pavements without injury thereto. B are detachable lugs which are in the form of angling members having a radially outwardly-projecting portion B' and a laterally projecting shank portion B². The lugs B are arranged in pairs and are adapted to engage the rim of the wheel on opposite sides thereof, their laterally-projecting shanks projecting inward and overlapping each other. C is a yoke, or other means, for engaging the over-lapping shank portions, and D is a cotter pin or other securing device which passes through apertures in said yoke and registering notches E in the shanks.

To retain the lugs in engagement with the rim and to reinforce the same, suitable seats or bearings are formed within the periphery of the rim. As shown, the rim is provided with inwardly-projecting portions F at opposite sides thereof, said portions having recesses G for receiving the radially projecting portions B' of the lugs and also being apertured for the passage of the shank portions B² thereof. Preferably, the recesses G are provided with bottom shoulders H forming end-thrust bearings for the lugs directly in line with their outwardly projecting portions.

With the construction as described when the tractor is being driven over roads or pavements, the lugs are either detached or are so adjusted as not to project beyond the smooth periphery of the wheel. To engage the lugs their shanks B² are inserted through the apertures in the seats and are engaged with the yoke C, being locked in position by the cotter pins D. This will hold the outwardly-projecting portions B' in the recesses G so that all stress communicated to the lug will be transmitted to the socket. To remove the lugs the cotter pins are withdrawn, whereupon the shanks can be disengaged from the yoke and removed from the wheel. If, however, it is desired to still carry the lugs upon the wheel, they may be reversed in position, as shown in Fig. 5, and again locked by the yoke and cotter pin. To permit of this the shanks B² are provided, in addition to the notches E, with notches E', which will register with the cotters in the reversed position of the lugs.

What I claim as my invention is:

1. The combination with a tractor wheel having a smooth periphery, of a pair of lugs for embracing the opposite sides of the periphery of said wheel, said lugs being of angle shape having laterally-extending shanks overlapping each other, and means for detachably securing said shanks to each other and to the wheel.

2. The combination with a tractor wheel having a smooth periphery, of a pair of lugs embracing the opposite edges of said wheel and provided with laterally extending shanks overlapping each other, sockets for receiving said lugs at the sides of the wheel, and yokes for embracing the overlapping shanks.

3. The combination with a tractor wheel having a smooth periphery, of a pair of lugs for embracing opposite sides of said wheel and engaging socket bearings thereon, said lugs being provided with overlapping laterally extending shank portions, a yoke for embracing said overlapping shank portions, and means for detachably securing said shanks within said yoke.

4. The combination with a tractor wheel having a smooth periphery, of a pair of lugs for embracing opposite sides of said wheel and engaging socket bearings therein, said lugs having overlapping laterally-extending shank portions, a yoke for embracing said overlapping shank portions, and a cotter pin extending through an aperture in said yoke and registering notches in said shanks.

5. The combination with a tractor wheel having a smooth periphery, of a pair of lugs embracing opposite sides of said wheel, each comprising a radially-extending portion and a laterally-extending shank portion, sockets at the sides of said wheel for receiving the radially projecting portions of said lugs and apertured for the passage of said laterally-extending shanks, a yoke embracing adjacent overlapping portions of said shanks, and a cotter pin engaging an aperture in said yoke and registering notches in said overlapping shanks.

6. The combination with a tractor wheel having a smooth periphery, of a pair of lugs for embracing the opposite sides of the periphery of said wheel and extending radially outward, and means for securing said lugs permitting the reversing of the same.

7. The combination with a tractor wheel having a smooth periphery, of a pair of lugs in the form of angle bars, each having a radially-extending portion and a laterally-extending shank portion, bearings for said lugs at the sides of the wheel provided with guides for the radially-extending portions and apertured for the laterally-extending portions, a yoke for receiving overlapping ends of said laterally-extending portions, a cotter pin for passing through said yoke and engaging registering notches in said laterally-extending portions, the latter being provided with notches for engaging said cotter when said lugs are in reversed position.

In testimony whereof I affix my signature.

IRA G. HUMPHREY.